United States Patent [19]

Zimmerman

[11] Patent Number: 4,626,435
[45] Date of Patent: Dec. 2, 1986

[54] INDIVIDUAL COFFEE BREWING

[76] Inventor: Mark E. Zimmerman, P.O. Box 2315, Pasadena, Calif. 91102

[21] Appl. No.: 798,816

[22] Filed: Nov. 18, 1985

[51] Int. Cl.⁴ .......................... A23F 5/24; B65B 29/02
[52] U.S. Cl. ....................................... 426/78; 426/77; 426/433; 99/287; 99/323.2; 99/295
[58] Field of Search ................................. 426/77–84, 426/67, 477, 591, 595, 85, 86, 433; 206/0.5; 99/287, 323.2

[56] References Cited

U.S. PATENT DOCUMENTS

| | | | |
|---|---|---|---|
| 2,123,054 | 7/1938 | Lamb et al. | 426/80 |
| 2,147,831 | 2/1939 | Doble | 426/81 |
| 2,187,417 | 1/1940 | Doble | |
| 2,889,226 | 6/1959 | Hinkley | 426/591 |
| 3,175,911 | 3/1965 | Rambold | |
| 3,384,492 | 5/1968 | Spencer | |
| 3,467,526 | 9/1969 | Mitchell et al. | 426/477 |
| 3,480,403 | 11/1969 | Hovey | 426/477 |
| 3,556,392 | 1/1971 | Robin | 426/83 |
| 3,579,351 | 5/1971 | Wege et al. | 426/80 |
| 3,607,302 | 9/1971 | Beck | 426/80 |
| 3,833,740 | 9/1974 | Schmidt | 426/80 |
| 3,879,565 | 4/1975 | Einstman et al. | 426/78 |
| 4,025,655 | 5/1977 | Whyte et al. | 426/82 |
| 4,141,997 | 2/1979 | Syroka et al. | 426/79 |
| 4,186,215 | 1/1980 | Buchel | 426/477 |
| 4,278,691 | 7/1981 | Donarumma | 426/80 |
| 4,410,550 | 10/1983 | Gaskill | 426/80 |
| 4,465,697 | 8/1984 | Brice et al. | 426/79 |

FOREIGN PATENT DOCUMENTS

| | | | |
|---|---|---|---|
| 888351 | 1/1962 | United Kingdom | 426/78 |
| 2057306 | 4/1981 | United Kingdom | 426/86 |
| 2076628 | 12/1981 | United Kingdom | 426/86 |

Primary Examiner—Steven Weinstein
Attorney, Agent, or Firm—J. L. Jones, Sr.

[57] ABSTRACT

A coffee serving contains a composition of a combination of a preselected amount of a coffee bean selection in flaked or ground coffee particle size and a preselected amount of a fruit acid-sodium bi-carbonate foamer composition, intimately mixed together in a water porous film serving unit bag. The ground coffee composition is disposed and secured in a serving unit bag, and is brewed in a preselected volume of boiling water for a preselected time period. When the unit bag of coffee combination is initially disposed in the boiling water, the unit bag floats, due to the carbon dioxide gas formed and evolving in the wetted bag, the gas agitating the grounds. As the carbon dioxide gas finally disperses through the porous film wet bag, the bag sinks to the bottom of the container of hot coffee solution. The slightly acidified or neutral pH brewed coffee solution is now ready to drink.

4 Claims, 3 Drawing Figures

INDIVIDUAL COFFEE BREWING

BACKGROUND OF THE INVENTION

The individual coffee brewing composition of this invention is classified in Classes 99 subclass 77.1 and 426 subclass 80 and 79.

Donarumma and Callahan, in U.S. Pat. No. 4,278,691 issued July 14, 1981, teaches a granular coffee disposed and secured in a water-permeable bag portion having a water-reservoir bag portion superimposed and positioned above the water-permeable coffee bag. Water is passed downwardly in a positive manner from the reservoir into the lower coffee in the water permeable bag.

Edward C. Syroka and Bernice A. Syroka, in U.S. Pat. No. 4,141,997, issued Feb. 27, 1979, teaches a double compartment bag. The pair of opposed commodity compartments are rectangular in shape and have an inverted U-shape resilient clip secured along the central media separating the two compartments. The U-shaped clip is secured on the coffee cup rim.

Wege and Gast, in U.S. Pat. No. 3,579,351 issued May 18, 1971, teach a filter paper coffee bag filled with coffee powder and having the open bag top end secured to a flanged ring. The flanged ring rests on a coffee cup top. Boiling water is then poured onto the coffee powder, through the flanged open ring, dependent on the cup rim.

Robin, in U.S. Pat. No. 3,556,392, issued Jan. 19, 1971, teaches a selected permeability of coffee bag for brewing individual servings. The paper bag has pleats along the side of the bag.

A coffee bag is taught by Spencer in U.S. Pat. No. 3,384,492 issued May 21, 1968 in which a brewing granule containing outer bag also has an inwardly extending inner bag extending from the mouth of the outer bag. A spoon can be inserted in the mouth of the inner bag having liquid therein, enabling the brewing liquid to be vigorously stirred and drained through the granules in the outer bag.

An infusion device for coffee or tea is taught by Rambold in U.S. Pat. No. 3,173,911 issued on Mar. 30, 1965. A small handling tag is attached to the infusion bag by a string. The tag has an opening therein in which can be impaled on the tea or coffee pot for protection of the infusion bag and its ready removal from the pot.

Doble, in U.S. Pat. No. 2,187,417 issued Jan. 16, 1940, teaches a coffee or tea bag in which perforations are placed in the infusion bag, placed so that the perforations allow ready release of gas.

SUMMARY OF THE INVENTION

A coffee brewing composition is contained in individual serving bags, and in preselected ground coffee bean amounts in a brewing bag. A composition for coffee brewing has a combination of a preselected weight of coffee bean in coffee particle size, flaked or ground, together with a preselected minor amount of a fruit acid-sodium bicarbonate dry foaming composition. The foaming composition utilizes a non-toxic free powdered fruit acid such as citric, ascorbic acid, or the like, together with powdered sodium/bicarbonate. The dry powder foaming composition does not react together, but the water wetted composition does react, as follows:

$$C_6H_8O_6 + NaHCO_3 = NaC_6H_7O_6 + CO_2 + H_2O$$

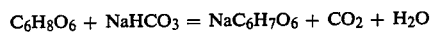

m.w. = 176.  m.w. = 84.  ascorbic acid

Other solid fruit acids, which are free of toxicity, such as citric acid, tartaric acid and malic acid, can be utilized with sodium bicarbonate to form foaming compositions with ground coffee in a coffee bag. Since one equivalent weight of sodium bicarbonate (weight 84.02) combines with one equivalent weight of fruit acid, the equivalent weights of the fruit acids are listed below:

| Fruit Acid | m.w. | Equiv. Wt. |
|---|---|---|
| Ascorbic Acid | 176. | 176. |
| Citric Acid | 192. | 64. |
| Tartaric Acid | 150. | 75. |
| Malic Acid | 134.1 | 67. |

Citric acid, the cheapest, easily available fruit acid, is a desirable reactant for the foaming composition. At least 64 g. of powdered citric acid (−400 mesh) should be integrally mixed with 84 g. of sodium bicarbonate. The dry composition is mixed in minor weight percentage with processed coffee, flaked or ground.

The equivalent ratio of fruit acid to sodium bicarbonate may also be varied. The equivalents of fruit acid to sodium bicarbonate may range from one to two or more, if the flavor is desired. The weight ratio of the foaming composition to the sized and mixed coffee may be varied in the coffee brewing composition as is necessary, from 5.0 to 10.0 wt. %.

Included in the objects of this invention are:

To provide a coffee bag for individually brewing a single cup of coffee, the coffee grounds being agitated by carbondioxide gas on wetting the bag with boiling water.

To provide an individually brewed cup of coffee with an improved taste, free from bitterness, the coffee grounds agitated by $Co_2$ gas in boiling hot water.

To provide a coffee bag for an individual coffee serving.

To provide a preselected amount of a ground or flaked preselected coffee bean mix integrally mixed with a small preselected amount of a solid fruit acid-sodium bicarbonate foaming composition, all to be composited in a hot water and gas pervious coffee brewing bag, and agitated by carbondioxide gas formed by wetting the bag with boiling water.

To provide a solid foaming composition free of toxic acids, which is incorporated in minor percentage with a preselected weight ratio of a ground or flaked coffee bean, in a hot water porous film bag, the formed bag enclosing an individual amount of a coffee foaming composition.

Other objects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT OF THE INVENTION

Figure 1:
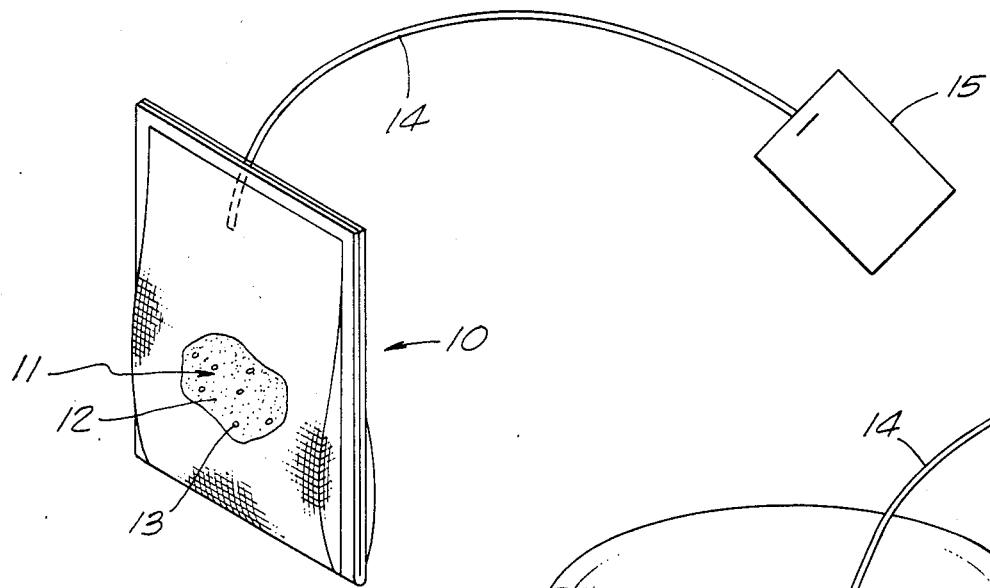
FIG. 1 illustrates an upright perspective view of a fresh individual brewing bag containing dry, roasted, ground coffee intimately mixed with a preselected portion of a foamer composition free of toxicity.

Referring to FIG. 1, the dry coffee serving bag 10 has a dry coffee brewing composition 11 sealed in the bag 10. The coffee brewing composition 11 has a combination of a preselected weight of coffee beans in a preselected coffee particle size 12, ground or flaked, together with a preselected minor weight of a fruit acid-sodium bicarbonate dry foamer composition 13. The foamer composition 13 is intimately mixed with the coffee particles 12. The foamer composition 13 utilizes a non-toxic, free, powdered (−400 mesh) fruit acid such as ascorbic acid (Vitamin C), citric, tartaric, malic acid or the like fruit acids or mixtures of these acids. The dry powdered foamer composition is premixed together and does not react chemically, but the water wetted foamer composition 13 does react as follows:

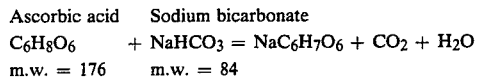

$$C_6H_8O_6 + NaHCO_3 = NaC_6H_7O_6 + CO_2 + H_2O \quad (1)$$
$$\text{m.w.} = 176 \quad \text{m.w.} = 84$$

Other fruit acids, which are free of toxicity in the usually human ingested amounts, such as citric acid, tartaric acid, and malic acid can be utilized with sodium bicarbonate to form foamer compositions with coffee particles in a coffee serving bag 10. Chemically speaking, since one equivalent weight of sodium bicarbonate (equiv. weight=84.02) combines with one equivalent weight of a fruit acid, the equivalent weight of other fruit acids are listed below:

| Fruit Acid | M.W. | Equiv. Wt. |
|---|---|---|
| Ascorbic Acid | 176. | 176. |
| Citric Acid | 192. | 64. |
| Tartaric Acid | 150. | 75. |
| Malic Acid | 134. | 67. |

In a general procedure, the powdered non-toxic fruit acid, or combination of fruit acid, is integrally mixed with the (−400 mesh) powdered sodium bicarbonate, there being at least a slightly greater equivalent of acid present, to form a foamer composition. A minor weight of the foamer composition is intimately mixed with a major weight of preselected coffee bean particle sized, ground or flaked, mixture. Typically, dry coffee serving bags 10 are prepared having 2.74 g. of coffee brewing composition suitable for brewing a 6 oz. cup of coffee.

In order to provide further taste guidelines, 2.93 g. of powdered ascorbic acid was intimately mixed with 1.0 g. of powdered sodium bicarbonate to form a foamer composition 13. There was added 58.6 g. of fresh 100% Columbian coffee 11, ground to a selected particle size, to the foamer composition 13. After an additional mixing time interval, the coffee brewing solid composition 11 was divided into 2.74 g. units, and each unit separately loaded into a unit individual serving bag having a string 14 secured to a bag 10 with a tag 15 on the opposed string end.

Further, mixtures of coffee 11 (58.6 g.) were made with varying amounts of ascorbic acid and the fixed amount of sodium bicarbonate (1.0 g.), increasing the excess equivalents of ascorbic acid over the equivalents of sodium/bicarbonate, in accordance with the data in Table II below.

The same 2.74 g. of coffee brewing solid compositions were secured in serving bags 10. The several coffee brewing solid compositions 10 were steeped and agitated in freshly boiled water (6 oz.) for the same period of time and tasted by a panel of three individuals. The taste panel results are given in Table II, indicating a strong preferred taste for a coffee liquid having a minor excess of ascorbic acid over sodium bicarbonate in the foamer composition.

TABLE II

Coffee particles in composition = 58.6 g.
Sodium bicarbonate in composition = 1.00 g. = 0.0119 g. equiv.

| No. | Fruit Acid | Wt. Ascorbic Acid (g) | Gram Equiv. | % Equiv. of Bicarbonate | Panel Taste |
|---|---|---|---|---|---|
| 1 | Ascorbic | 2.93 | 0.0166 | 139. | Best |
| 2 |  | 3.16 | 0.0182 | 153. | Not as good as No. 1 |
| 3 |  | 3.69 | 0.0212 | 178. | Poorer than No. 2 |
| 4 |  | 4.22 | 0.0243 | 204. | Poorest- Weakest |

The foamer composition can typically range from approximately 5.0 to 10.0 wt. % of the coffee brewing solid composition. The dry fruit acid should be slightly in equivalent excess in the foamer composition. The use of ascorbic acid in the foamer composition provides a means of increasing the coffee drinkers intake of ascorbic acid (Vitamin C), as 6 oz. brew of coffee contains 0.128 g. of ascorbic acid. A usual required dose of Vitamin C is given as 0.150 g. in the U.S. Pharmacoplia.

Figure 2:
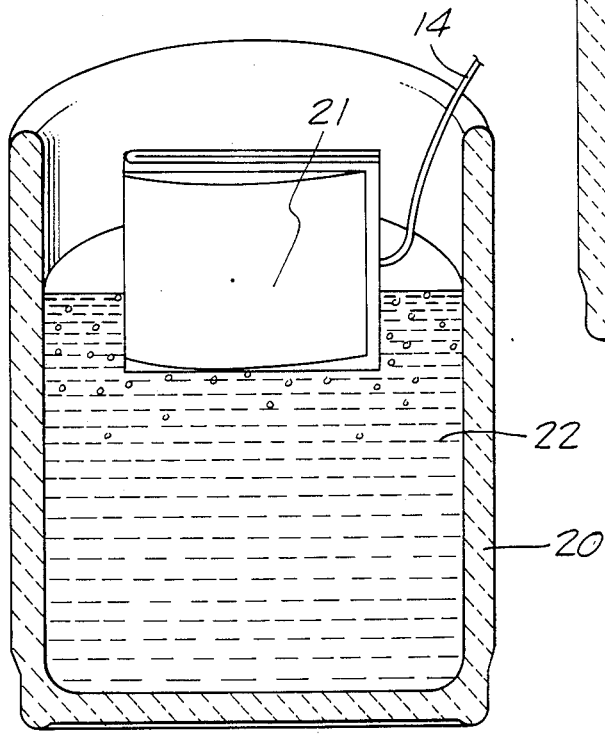
FIG. 2 illustrates an individual bag of FIG. 1 wetted by the freshly poured boiling water in a coffee cup. The wetted coffee bag is floating on the surface of the hot water as the gas is immersed and wetted by the hot water, the carbon dioxide forming and flowing from the porous bag.

Referring to FIG. 2 in detail, a dry bag of coffee serving is immersed in freshly boiled water 22, the bag 21 being partially wet and floating in the water 22 contained in the cup 20. Dunking the coffee bag 21 in the nearly boiling water 22, results in the evolution of carbon dioxide, according to equation (1), as the bag 21 is immersed in the water 22 by string 14, the coffee grounds being agitated.

Figure 3:
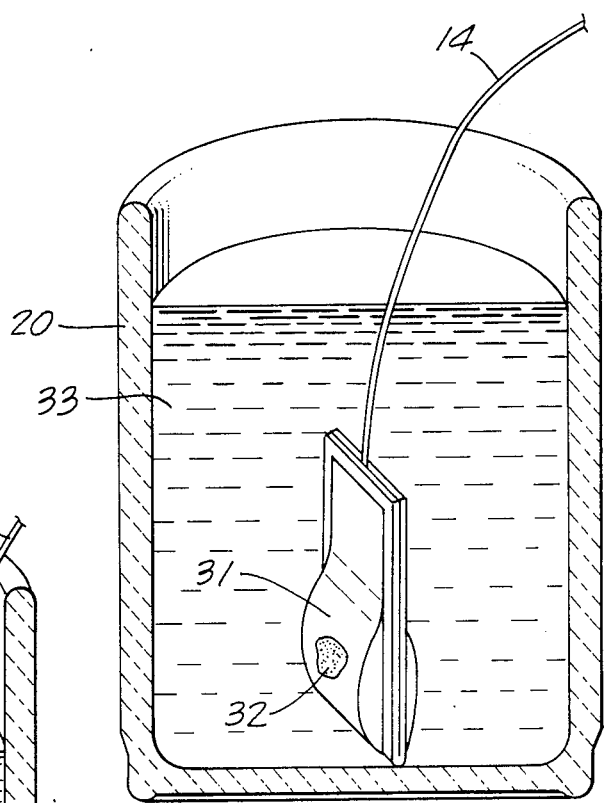
FIG. 3 illustrates the individual bag of exhausted coffee grounds resting at the cup bottom, after the carbon dioxide gas has escaped from the bag.

Finally, coffee 33 is brewed, as shown in FIG. 3, with the exhausted coffee bag 31 settling in the bottom of cup 20. The exhausted coffee grounds 32 settle in the bottom of bag 31. The settlement of bag 31 in the bottom of cup 20 can be taken as a signal the coffee grounds 32 are exhausted and the coffee liquid is ready for drinking. The string tag 15 facilitates the bag 31 dipping and brewing process.

Various preselected quantities of coffee beans, ground to preselected size coffee particles, can be adaptively secured and disposed in a preselected size coffee bag. The dry coffee serving bag can typically contain enough coffee composition to brew one 6 oz. cup of coffee brew to 6-10 more cups of coffee brew, as is desired.

Many modifications in the individual coffee brewing can be made in the light of my teachings. It is understood that within the scope of the claims, the invention can be practiced otherwise than as described.

I claim:
1. A coffee brewing solid composition disposed and secured in a water permeable, preselected size, and closed bag comprising:

a preselected weight of sized ground and flaked coffee beans, and, a preselected minor weight percentage based on the coffee brewing solid composition of a dry, solid, powdered composition which foams and forms carbon dioxide gas on wetting with boiling hot water, said foamer composition having a selected ratio of chemical equivalents of powdered sodium bicarbonate and a powdered fruit acid, said chemical equivalent weight of fruit acid at least equal to the equivalent weight of sodium bicarbonate, aforesaid powdered foamer composition intimately mixed with said preselected weight of coffee beans and being in an amount sufficient to produce sufficient carbon dioxide gas to agitate said coffee beans when wetted with boiling hot water.

2. A coffee brewing solid composition disposed and secured in a water permeable, preselected size, and closed bag comprising:

a preselected weight of sized comminuted coffee beans, and, a preselected 5% to 10% weight based on the coffee brewing solid composition of a dry, solid, powdered composition which foams and forms carbon dioxide gas on wetting with boiling hot water, said foamer composition having a selected ratio of chemical equivalents of powdered sodium bicarbonate and a powdered fruit acid, said equivalent weight of fruit acid at least equal to 140% equivalent of sodium bicarbonate, aforesaid powdered foamer composition intimately mixed with said preselected weight of sized coffee beans and being in an amount sufficient to produce sufficient carbon dioxide gas to agitate said coffee beans when wetted with boiling hot water.

3. A coffee brewing solid composition disposed and secured in a water permeable, preselected size, and closed bag comprising:

a preselected weight of sized ground coffee beans, and, a preselected weight of sized ground coffee beans, and, a preselected 5 to 10% weight based on the coffee brewing solid composition of a dry, solid, powdered composition which foams and forms carbon dioxide gas on wetting with boiling hot water, said foamer composition having a selected ratio of chemical equivalents of powdered sodium bicarbonate and a powdered fruit acid, said chemical equivalent weight of fruit acid at least equal to the equivalent of sodium bicarbonate, aforesaid powdered foamer composition intimately mixed with said preselected weight of sized coffee beans and being in an amount sufficient to produce sufficient carbon dioxide gas to agitate said coffee beans when wetted with boiling hot water.

4. A coffee brewing solid composition disposed and secured in a water permeable, preselected size, and closed bag comprising:

a preselected weight of sized ground coffee beans, and, a preselected 5% to 10% weight based on the coffee brewing solid composition of a dry, solid, powdered composition, which foams and forms carbon dioxide gas on wetting with boiling hot water, said foamer composition having a selected ratio of chemical equivalents of powdered sodium bicarbonate and ascorbic acid, said ascorbic acid at least equal to 140% equivalent of sodium bicarbonate, aforesaid powdered foamer composition intimately mixed with said preselected weight of sized coffee beans and being in an amount sufficient to produce sufficient carbon dioxide gas to agitate said coffee beans when wetted with boiling hot water.

* * * * *